United States Patent [19]

Magee et al.

[11] Patent Number: 5,568,890
[45] Date of Patent: Oct. 29, 1996

[54] VEHICLE STORAGE CABINET

[76] Inventors: Jack C. Magee, 622 N. Highland, Pierre, S. Dak. 57501; George Thompson, 215 E. 31st St., Sioux Falls, S. Dak. 57105

[21] Appl. No.: 517,478

[22] Filed: Aug. 21, 1995

[51] Int. Cl.⁶ ..................................................... B60R 7/00
[52] U.S. Cl. .......................... 224/539; 224/542; 224/543; 224/42.32; 296/37.6
[58] Field of Search ................................. 224/539, 542, 224/543, 42.32, 42.33, 42.34, 42.36, 42.35; 296/37.1, 37.5, 37.6

[56] References Cited

U.S. PATENT DOCUMENTS

| | | | |
|---|---|---|---|
| 4,573,731 | 3/1986 | Knaack et al. | 224/539 |
| 4,733,898 | 3/1988 | Williams | 224/542 |
| 4,844,305 | 7/1989 | McKneely | 224/42.42 |
| 5,025,964 | 6/1991 | Phirippidis | 224/42.42 |
| 5,083,827 | 1/1992 | Hollenbaugh, Sr. | 296/37.1 |
| 5,207,469 | 5/1993 | Rossi | 224/539 |
| 5,238,284 | 8/1993 | Whitaker | 296/37.16 |
| 5,456,514 | 10/1995 | Justice | 224/542 |

OTHER PUBLICATIONS 1 page of catalog "Premier Motoring Accessories," item E, "Storage Drawer," p. 15 (Author, publisher, place of publication, and date unknown).

*Primary Examiner*—David J. Walczak
*Attorney, Agent, or Firm*—Gene R. Woodle

[57] ABSTRACT

Embodiments of a vehicle storage cabinet which fits on the floor of the cargo compartment of a utility vehicle. Articles may be safely and securely stored or transported inside the vehicle storage cabinet and other articles may be stored or transported on top of the vehicle storage cabinet. Storage compartments are provided which are accessible through the top of the vehicle storage cabinet and other compartments are provided which are accessible only when the cargo compartment of the utility vehicle is opened. The vehicle storage cabinet is portable and may be transferred to and from the vehicle with relative ease.

6 Claims, 4 Drawing Sheets

VEHICLE STORAGE CABINET

BACKGROUND OF THE INVENTION

1. Field of the Invention

The present invention relates to the field of containers for storing a variety of items in a motor vehicle and more particularly to storage cabinets for sport or utility vehicles.

2. Background Information

There is a large class of passenger vehicles which have two compartments: a passenger compartment in the front and a cargo or luggage compartment in the rear. Such cargo or luggage compartments are typically significantly larger than a conventional sedan trunk and are typically accessible through a back door which may open upward, downward, or from either side. Pickups, station wagons, and sport utility vehicles are examples of vehicles in this class.

The cargo compartments of such vehicles are often used to store or transport a wide variety of objects or materials ranging from luggage to hunting and fishing gear to building materials. The use of such cargo compartments for storage or transport of such a wide variety of objects or materials often results in several problems. When many articles are placed in such cargo compartments they regularly become disorganized and it may become difficult to locate a particular article.

Articles placed in such cargo compartments are often susceptible to theft and, in the case of open cargo compartments, are also susceptible to weather damage. Articles placed in the cargo compartment of vehicles such as station wagons are ordinarily in plain view through windows, and, therefore, a more tempting target to thieves than hidden articles. In many instances parents desire a relatively secure place to store dangerous articles such as medicines or weapons to prevent access by children while traveling.

Furthermore, relatively delicate articles such as fishing poles or instruments are susceptible to breakage when transported in an open cargo compartment with other, sturdier, items.

In many instances persons such as travelers, salesmen, or hunters desire a portable storage cabinet which may be moved back and forth from the house, office, or motel to their vehicle with relative ease. Salesmen, for example, may have valuable samples which they do not wish to leave in their vehicles overnight while traveling.

Owners of enclosed utility vehicles often would find it convenient to have an interior storage area which may be accessed from inside the vehicle. Owners of utility vehicles also would find it desirable to have a protected storage area which may be accessed without unloading the rest of the cargo compartment and upon which articles may be stored or transported.

Several attempts have been made to solve at least some of the aforementioned problems. One such attempt is disclosed in the patent to Whitaker (U.S. Pat. No. 5,238,284, Aug. 24, 1993). The Whitaker patent discloses a semi-rigid cargo cover which is attached near the top of a cargo compartment by D-rings which engage hooks fastened to the side walls of the cargo compartment. This invention does provide a cover for cargo and does provide for limited storage of articles on top of the cargo cover. However, the invention does not solve other problems outlined above.

Another attempt to solve problems related to vehicle cargo compartments is disclosed in the patent to Phirippidis (U.S. Pat. No. 5,025,964, Jun. 25, 1991). The Phirippidis patent discloses a universal, modular, vehicle organizer which fits into the trunk of a car or the rear of a van. The organizer rest on the floor of the trunk or van and is divided to provide useful storage spaces for sales literature, catalogs, samples, or parts for use by persons engaged in sales or repair. This invention does provide a method for organizing articles stored or transported in the cargo compartment of a vehicle, but does not solve the other problems outlined above.

The ideal vehicle storage cabinet provides all of the following for objects or materials stored or transported in the cargo compartment: organization, security, protection, portability, convenience, and safe storage or transport of other objects on top of the storage cabinet.

SUMMARY OF THE INVENTION

The vehicle storage cabinet of the instant invention solves the problems associated with the storage and transport of objects or materials in the cargo compartment of a utility vehicle. The vehicle storage cabinet provides a safe and secure storage area for articles stored or transported in the cargo compartment of a utility vehicle. Articles may be stored or transported both inside and on top of the vehicle storage cabinet and the interior of the vehicle storage cabinet may be accessed without removing articles placed on top of the cabinet. The vehicle storage cabinet is also portable and may be moved back and forth to and from the vehicle with relative ease.

One major objective of the vehicle storage cabinet is to provide a method whereby articles placed in vehicle cargo compartments may be organized and easy to locate by providing various compartments for storage.

Another objective of the vehicle storage cabinet is to help prevent theft by removing articles from view and by also providing a secure storage area; and, in the case of open cargo compartments, to help prevent weather damage by providing a covered storage area which may be secured.

Another objective of the vehicle storage cabinet is to provide a secure storage area where dangerous items such as weapons or guns may be stored to prevent access by children while traveling.

Another objective of the vehicle storage cabinet is to provide a separate, secure, storage area where relatively delicate articles such as fishing poles or instruments may be stored and protected from damage by contact with other, sturdier, items during transport. Another objective of the vehicle storage cabinet is to proved a storage cabinet which is portable and may be moved back and forth from the house, office, or motel to the vehicle with relative ease.

Another objective of the vehicle storage cabinet is to provide owners of enclosed utility vehicles with an interior storage area which may be accessed form inside the vehicle.

Another objective of the vehicle storage cabinet is to provide owners of utility vehicles with a protected storage area which may be accessed without unloading the rest of the cargo compartment and upon which articles may be stored or transported.

Another objective of the vehicle storage cabinet is to provide an efficient storage and transport system which is both simple and economic.

These and other features of the invention will become apparent when taken in consideration with the following detailed description and drawings.

DESCRIPTION OF A PREFERRED EMBODIMENT

Figure 1:
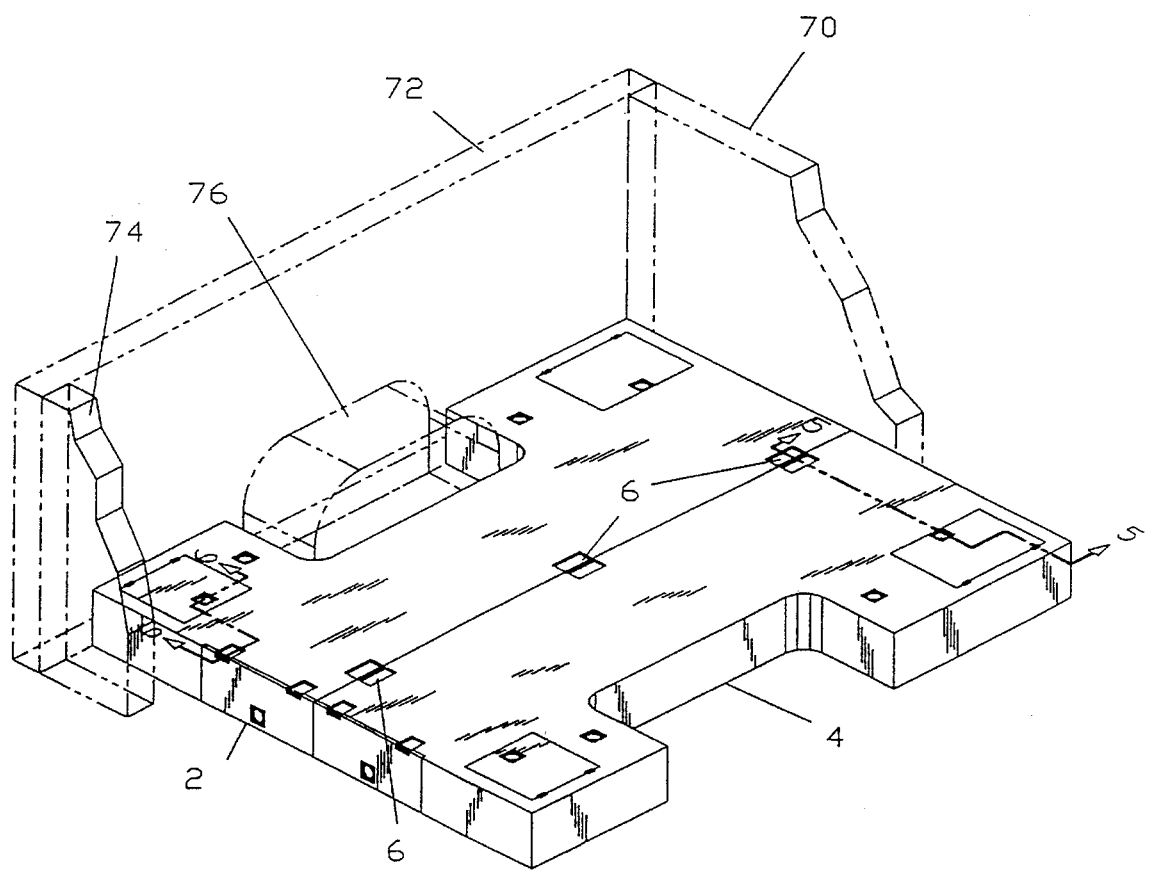
FIG. 1 is a perspective view of a preferred form of a vehicle storage cabinet embodying the present invention.

Referring to the drawings, FIGS. 1 through 9, there is shown a preferred form of the vehicle storage cabinet embodying the present invention.

Referring to FIG. 1, there is a section 2 which is essentially a flat, hollow box having front, back, top, bottom, inside, and outside walls. There is a section 4 which is a mirror image of the section 2 taken along the inside face of the inside wall of said section 2. Said section 2 and the section 4 are joined by three top hinges 6 on the top of said section 2 and said section 4 abutting the inner face of said section 2 and said section 4. The top hinges 6 are recessed such that the tops of said top hinges 6 are flush with the top of said section 2 and said top hinges 6 are spaced with one near the midpoint of the inner wall of said section 2 and one near the front of said section 2 and one near the back of said section 2. Because said section 4 is a mirror image of said section 2, only features of said section 2 are described with the understanding that all features are duplicated in said section 4.

Figure 2:
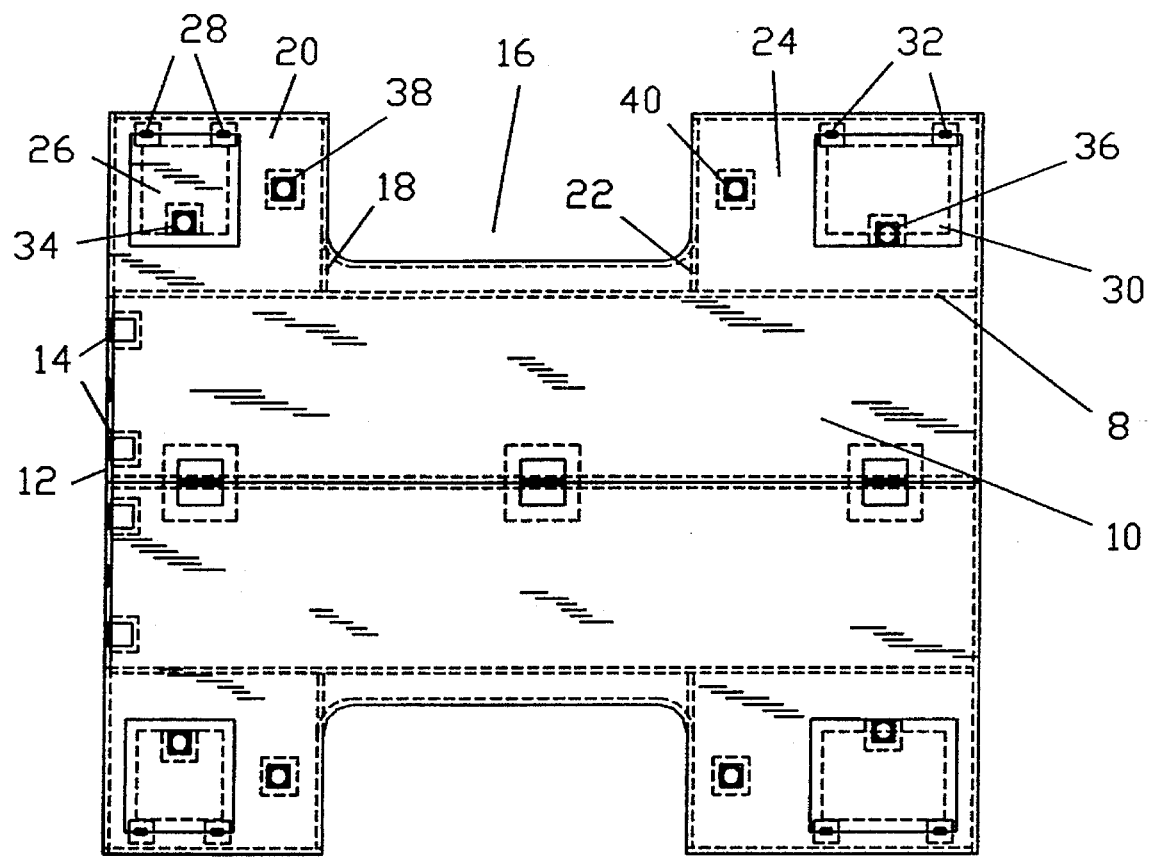
FIG. 2 is a top-plan view of the vehicle storage cabinet of FIG. 1.

Referring now to FIG. 2, there is a wall 8 perpendicular to the top of said section 2 and connecting to the top, bottom, front, and back walls of said section 2 forming and enclosed compartment 10. The front wall of said section 2 is cut vertically at the front end of the wall 8 to form a front door 12. The front door 12 is connected to the top wall of said section 2 by two front door hinges 14. The front door hinges 14 are affixed to the front edge of the top wall of said section 2 and to the top of said front door 12 and are recessed such that the tops of said front door hinges 14 are flush with the top of said section 2 and the front of said front door hinges 14 are flush with the front of said front door 12. Said front door hinges 14 are spaced with one near the inside edge of said front door 12 and one near the outside edge of said front door 12.

There is a recess 16 on the outside portion of said section 2. The recess 16 is slightly larger than the wheel well in the cargo compartment of a vehicle which has wheel wells and a cargo compartment.

There is a forward wall 18 parallel to the from wall of said section 2 and connecting to the top and bottom walls of said section 2, to said wall 8, and to the front wall of said recess 16 forming an enclosed compartment 20.

There is a rearward wall 22 parallel to the front wall of said section 2 and connecting to the top and bottom walls of said section 2, to said wall 8, and to the back wall of said recess 16 forming an enclosed compartment 24.

There is a forward door 26 in the top wall of said section 2 near the front, outside corner of said section 2 opening into compartment 20. The forward door 26 is connected to the top wall of said section 2 by two forward hinges 28. The forward hinges 28 are recessed such that the tops of said forward hinges 28 are flush with the top of said section 2. Said forward hinges 28 are located on the outside edge of said forward door 26 and are spaced with one near the front edge of said forward door 26 and one near the back edge of said forward door 26.

There is a rearward door 30 in the top wall of said section 2 near the back, outside corner of said section 2 opening into compartment 24. The rearward door 30 is connected to the top wall of said section 2 by two rearward hinges 32. The rearward hinges 32 are recessed such that the tops of said rearward hinges 32 are flush with the top of said section 2. Said rearward hinges 32 are located on the outside edge of said rearward door 30 and are spaced with one near the front edge of said rearward door 30 and one near the back edge of said rearward door 30.

There is a pull ring 34 in the top of said forward door 26 near the center of the inside edge of said forward door 26 there is a pull ring 36 in the top of said rearward door 30 near the center of the inside edge of said rearward door 30.

There is an anchor ring 38 in the top wall of said section 2 between the back edge of said forward door 26 and the front edge of said recess 16. There is an anchor ring 40 in the top wall of said section 2 between the front edge of said rearward door 30 and the back edge of said recess 16.

Figure 3:
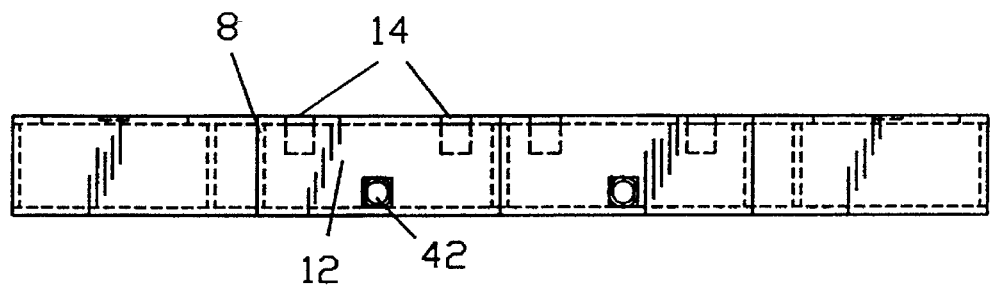
FIG. 3 is a front view of the vehicle storage cabinet of FIG. 1.

Referring now to FIG. 3, there is a pull ring 42 in the from face of said front door 12 near the center of the bottom of said front door 12.

All anchor rings and pull rings are recessed.

Figure 5:
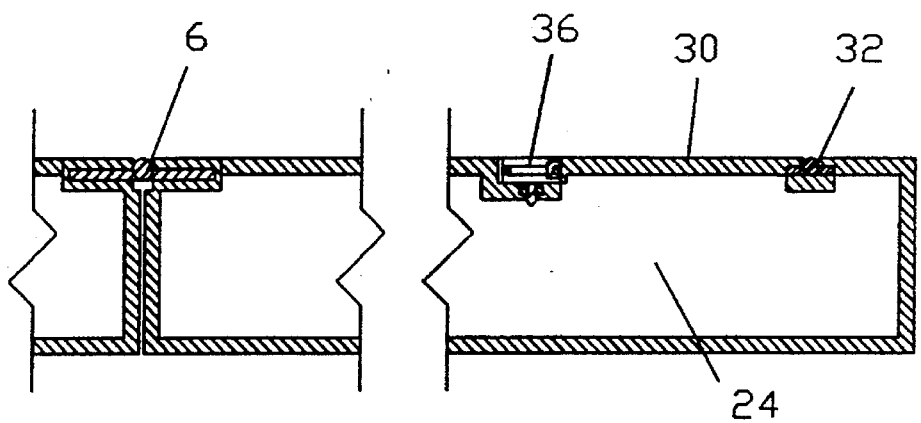
FIG. 5 is a partial sectional view of the vehicle storage cabinet taken along line 5—5 of FIG. 1.

Referring now to FIG. 5, a sectional view of a typical hinge and door arrangement is shown. Access to said compartment 24 is provided by pulling on said pull ring 36 which causes said rearward door 30 to open rotating about said rearward hinges 32.

Figure 6:
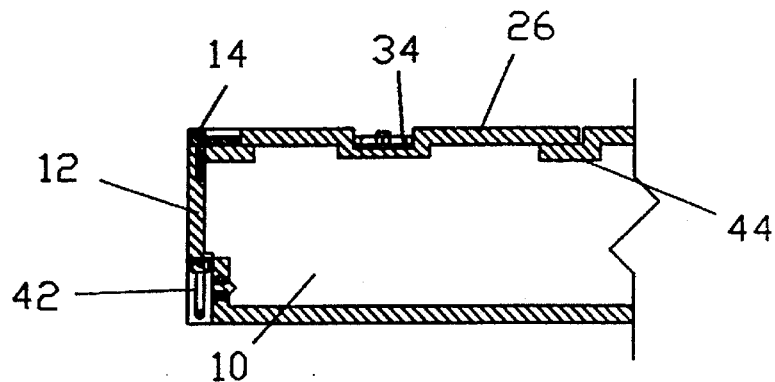
FIG. 6 is a partial sectional view of the vehicle storage cabinet taken along line 6—6 of FIG. 1.

Referring now to FIG. 6, a sectional view of a typical hinge and door arrangement is shown in another view as well as said front door 12. Access to said compartment 10 is provided by pulling on the pull ring 42 which causes said front door 12 to open rotating about said front door hinges 14. A lip 44 is provided on the top wall of said section 2 around openings to said compartment 20 and said compartment 24 to provide support for said forward door 26 and said rearward door 30 respectively.

Figure 7:
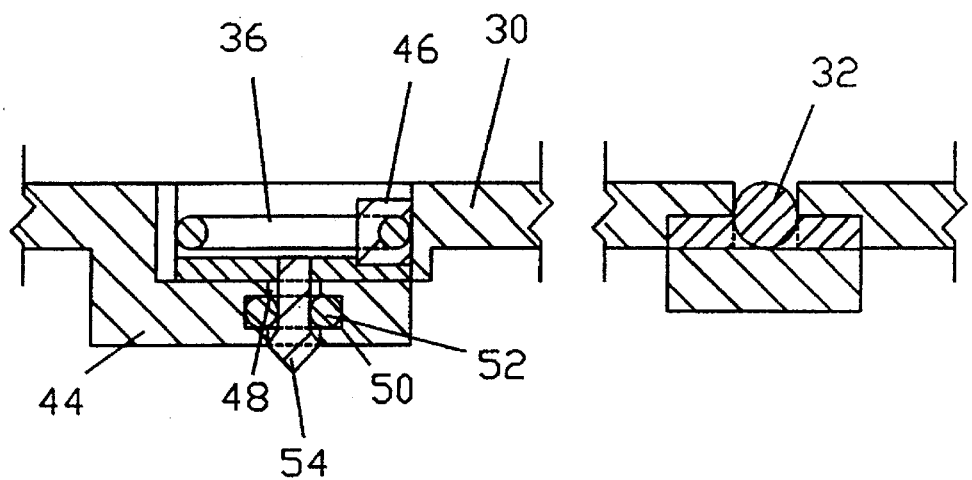
FIG. 7 is a partial sectional view of the vehicle storage cabinet showing a portion of FIG. 5 in enlarged scale.

Referring now to FIG. 7, a typical latch assembly is shown. Pull rings such as said pull ring 36 pivot on a swivel 46 which is attached to the door such that that section of the pull ring nearest the corresponding hinges passes through the swivel 46. There is a cylindrical hole 48 through the lip 44 opposite and centered upon each pull ring. There is a cylindrical slot 50 within said lip 44 centered upon each of the holes 48. The slots 50 are also centered within said lip 44 and have a width less than the width of said lip 44. The diameter of said slots 50 is slightly greater than the diameter of said holes 48. There is an O-ring 52 within each of said slots 50. The outer diameter of the O-rings 52 is slightly less than the diameter of said slots 50 and the inner diameter of said O-rings 52 is slightly less than the diameter of said holes 48. A pin 54 is affixed to each door and is aligned with and protrudes through each of the holes 48 and the O-rings 52. The diameter of the pins 54 varies with the diameter of said pins 54 being slightly less than the inner diameter of said O-rings 52 at the portion of said pins 54 nearest the door. The diameter of said pins 54 increases to slightly less than the diameter of said holes 48 for those portions of said pins 54 which protrude beyond said O-rings 52. The ends of said pins 54 opposite the door come to a point. The doors are shut by pushing said pins 54 through said O-rings 52. Contact of the wide portions of said pins 54 with the inner surface of said O-rings 52 keeps the doors form opening accidentally, but the doors may be opened by pulling firmly on the pull rings.

Said anchor rings 38 and 40 (shown in FIG. 2) are configured identically to pull rings such as said pull ring 36 and also pivots on a swivel such as said swivel 46. Anchor rings may be used as anchor points to secure cargo stored or transported on top of the vehicle storage cabinet.

Figure 4:
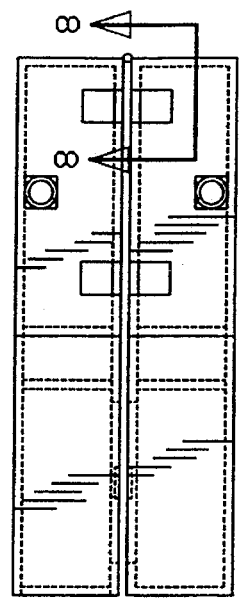
FIG. 4 is also a front view of the vehicle storage cabinet of FIG. 1, but shows the cabinet in a folded position.

Referring now to FIG. 4, said section 2 and said section 4 may be folded about said top hinges 6 into the configuration shown in this figure.

Figure 8:
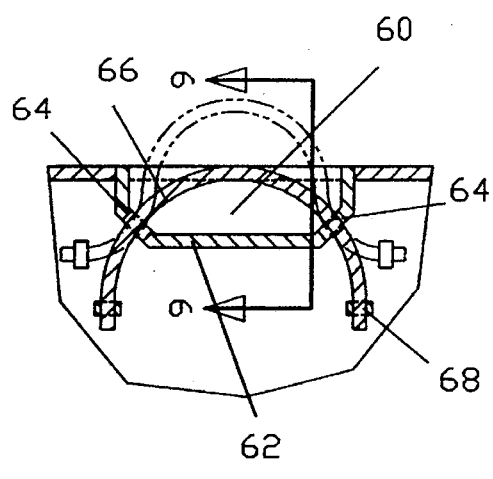
FIG. 8 is a partial sectional view of the vehicle storage cabinet taken along line 8—8 of FIG. 4.

Referring now to FIG. 8, the inner wall of said section 2 contains a handle opening 60 bounded by a handle wall 62. There are two holes 64 in the handle wall 62 in those portions of said handle wall 62 furthest from the center of the inner wall of said section 2. A handle 66 having a generally cylindrical shape and a diameter slightly less than the diameter of said holes 64 has its ends inserted through said holes 64 such that the middle of the handle 66 is within the handle opening 60. Two clips 68 having a generally cylindrical shape and a diameter greater than the diameter of said holes 64 are attached to the ends of said handle 66. Said section 4 also contains a handle opening 60, a handle wall 62, two holes 64, a handle 66, and two clips 68 identical to those described above as being contained in said section 2. When said section 2 and said section 4 are unfolded said handle 66 is completely inside said handle opening 60 and said section 2. As shown by the phantom lines in FIG. 8 said handles 66 may be pulled from said handle opening 60 when said section 2 and said section 4 are folded and said handles 66 may be used to carry the vehicle storage cabinet. The handle clips 68 prevent the ends of said handle 66 from being pulled through said holes 64. Said handle opening 60 is located near the center of the inner wall of said section 2.

Figure 9:
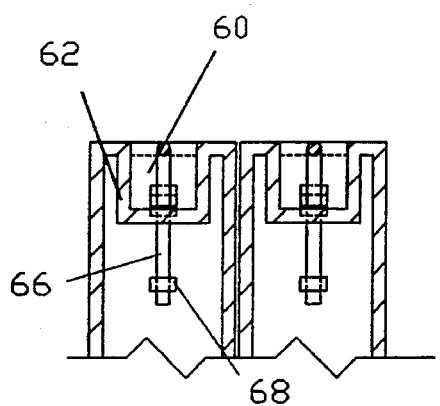
FIG. 9 is a partial sectional view of the vehicle storage cabinet taken along line 9—9 of FIG. 8.

Referring now to FIG. 9, another view of said handle opening 60, said handle wall 62, said handle 66, and said handle clips 68 is shown for clarity.

Referring again to FIG. 1, the phantom lines show a typical configuration of a vehicle having a cargo storage area. Wall 70 represents the back seats or rear passenger wall of such a vehicle. Wall 72 represents the side wall of such a vehicle. Wall 74 represents the back door of the cargo compartment of such a vehicle. Wheel well 76 represents the protruding wheel well of such vehicles which have wheel wells. When outside the vehicle the vehicle storage cabinet may be folded as shown in FIG. 4. The vehicle storage cabinet may then be placed inside the vehicle and unfolded. Said recesses 16 fit over the wheel wells and the vehicle storage cabinet covers the floor of the cargo compartment. Articles may be stored within said compartments 26 and 30 and other articles may be stored or transported on top of the vehicle storage cabinet. Said anchor rings 38 and 40 may be used to anchor items on top of the vehicle storage cabinet. Said compartments 26 and 30 are accessible from within the vehicle. When the rear cargo compartment door is opened said front door 12 may be opened and articles stored within said compartment 10. If the rear cargo compartment door is closed and locked the door blocks said front door 12 effectively preventing access to said compartment 10 and providing secure storage safe from thieves and providing a storage place inaccessible to children. The vehicle storage cabinet may be removed by folding as shown in FIG. 4 and may be carried by use of said handles 66.

In the preferred embodiment of the vehicle storage cabinet all hinges, pull rings, anchor rings, and accompanying swivels are conventional and made from steel, but other materials having sufficient strength and durability could be used. Said pins 54 are made from steel, but other materials having sufficient strength and durability could be used. Said O-rings 52 are also conventional and made of resilient plastic, but other materials such as rubber and the like could be used. Said handles 66 are made from nylon rope, but other materials having sufficient strength, durability, and flexibility could be used. Said handle clips 68 are conventional and made from aluminum, but other materials having sufficient strength and malleability could be used. All other elements are made from tough, durable plastic; but other materials such as aluminum, wood, or the like could be used. All joints and connections are made with adhesives, but other fastening methods could be used.

In the preferred embodiment of the vehicle storage cabinet said recesses 16 are shown and described, but the vehicle storage cabinet could easily be made without said recesses 16 for use with vehicles not having wheel wells.

While preferred embodiments of this invention have been shown and described above, it will be apparent to those skilled in the art that various modifications may be made in these embodiments without departing form the spirit of the present invention. For that reason, the scope of the invention is set forth in the following claims:

We claim:

1. A vehicle storage cabinet for a utility vehicle wherein the vehicle includes a cargo compartment having a floor space having a right side and a left side, opposed side walls which define a height of the cargo compartment, opposed wheel wells and a cargo compartment door at a rear of the utility vehicle; said vehicle storage compartment comprising:

a left section adapted to rest on the floor space of the cargo compartment of a utility vehicle having the general shape of a flat box and having a top wall, a bottom wall, a front wall, a back wall, and outside wall, and an inside wall; the left section being slightly smaller than half the floor space of the cargo compartment of a utility vehicle; the half being the left side of the utility vehicle looking from the rear of the vehicle toward a front of the vehicle; said left section being of a height less than half the height of the cargo compartment; and the front wall of said left section being the wall closest to the cargo compartment door of the utility vehicle;

a right section adapted to rest on the floor space of the cargo compartment of a utility vehicle being identical to said left section, but the right section being a mirror image of said left section taken along an inner face of the inside wall of said left section; the inner face of the inside wall of said left section being the face closest to a plane taken through a center of the vehicle perpendicular to the plane of the wheels;

a plurality of hinges affixed to and connecting said left section and said right section; the hinges being affixed to the top wall of said left section and to the top wall of said right section such that said left section and said right section may be rotated upon said hinges until the top walls of said left and right sections are in close proximity to each other;

a left opening adapted to face the cargo compartment door of the utility vehicle in the front wall of said left section; and a right opening adapted to face the cargo compartment door of the utility vehicle in the front wall of said right section;

whereby the vehicle storage cabinet may be folded upon said hinges and placed upon the floor of the cargo compartment of a utility vehicle and then unfolded to cover the floor of the cargo compartment and whereby articles may be placed upon the top wall of the vehicle storage cabinet for storage or transport and other articles may be inserted through the openings in the front walls of said left section and said right section and safely and securely stored or transported within said left section and said right section; and whereby said left section and said right section may be folded upon said hinges and removed from the vehicle.

2. A vehicle storage cabinet of claim 1 in which a left front door is fitted over the left opening and a right front door is fitted over the right opening and a plurality of left front door hinges is affixed to the left front door and said left section such that said left front door may be opened or closed using the left front door hinges to expose or close said left opening and a plurality of right front door hinges is affixed to the right front door and said right section such that said right front door may be opened or closed using the right front door hinges to expose or close said right opening.

3. A vehicle storage cabinet of claim 2 in which said left opening is near the inside wall of said left section and said right opening is near the inside wall of said right section and there is a left inner wall perpendicular to a top of said left section and connected to the top wall, the bottom wall, the front wall, and the back wall of said left section creating a compartment accessible through said left front door and a right inner wall perpendicular to a top of said right section and connected to the top wall, the bottom wall, the front wall, and the back wall of said right section creating a compartmem accessible through said right from door; and in which there is a plurality of left top openings in a portion of the top wall of said left section which is between the left side of the cargo compartment of the utility vehicle and the left inner wall and an equal number of left top doors fitted over respective left top openings and a plurality left top hinges affixed to the left top doors and the top wall of said left section such that said left top doors may be opened or closed providing access to the interior of said left section through said left top openings; and in which there is a plurality of right top openings in a portion of the top wall of said right section which is between the right side of the cargo compartment of the utility vehicle and the right inner wall and an equal number of right top doors fitted over respective right top openings and a plurality fight top hinges affixed to the right top doors and the top wall of said right section such that said right top doors may be opened or closed providing access to the interior of said right section through said right top openings.

4. A vehicle storage cabinet of claim 1 for utility vehicles which have wheel wells which protrude upward into the cargo compartment in which there is a left recess in an outer portion of said left section slightly larger than a left wheel well and through which the left wheel well may protrude and in which there is a right recess in an outer portion of said right section slightly larger than a right wheel well and through which the right wheel well may protrude.

5. A vehicle storage cabinet of claim 4 in which a left front door is fitted over the left opening and a right front door is fitted over the right opening and a plurality of left front door hinges is affixed to the left front door and said left section such that said left front door may be opened or closed using the left front door hinges to expose or close said left opening and a plurality of right front door hinges is affixed to the right front door and said right section such that said right front door may be opened or closed using the right front door hinges to expose or close said right opening.

6. A vehicle storage cabinet of claim 5 in which said left opening is near the inside wall of said left section and said right opening is near the inside wall of said right section and there is a left inner wall perpendicular to a top of said left section and connected to the top wall, the bottom wall, the front wall, and the back wall of said left section creating a compartment accessible through said left front door and a right inner wall perpendicular to a top of said right section and connected to the top wall, the bottom wall, the from wall, and the back wall of said right section creating a compartment accessible through said right front door; and in which there is a plurality of left top openings in the top wall of said left section to an outside of the left inner wall and an equal number of left top doors fitted over respective left top openings and a plurality left top hinges affixed to the left top doors and the top wall of said left section such that said left top doors may be opened or closed providing access to the interior of said left section through said left top openings; and in which there is a plurality of right top openings in the top wall of said right section to an outside of the right inner wall and an equal number of right top doors fitted over respective right top openings and a plurality right top hinges affixed to the right top doors and the top wall of said right section such that said right top doors may be opened or closed providing access to the interior of said right section through said right top openings.

* * * * *